(12) United States Patent
Marks

(10) Patent No.: US 10,442,067 B2
(45) Date of Patent: Oct. 15, 2019

(54) FASTENING TOOL WIRE GUIDE

(71) Applicant: WORKTOOLS, INC., Chatsworth, CA (US)

(72) Inventor: Joel S. Marks, Sherman Oaks, CA (US)

(73) Assignee: WORKTOOLS, INC., Chatsworth, CA (US)

( * ) Notice: Subject to any disclaimer, the term of this patent is extended or adjusted under 35 U.S.C. 154(b) by 365 days.

(21) Appl. No.: 15/400,866

(22) Filed: Jan. 6, 2017

(65) Prior Publication Data

US 2018/0193992 A1    Jul. 12, 2018

(51) Int. Cl.
*B25C 5/06* (2006.01)
*H02G 3/30* (2006.01)
*B25C 5/11* (2006.01)

(52) U.S. Cl.
CPC .............. *B25C 5/06* (2013.01); *B25C 5/11* (2013.01); *H02G 3/30* (2013.01)

(58) Field of Classification Search
CPC .. B25C 5/06; B25C 5/11; B25B 31/00; H02G 3/30
USPC .................................... 227/142, 147, 151
See application file for complete search history.

(56) References Cited

U.S. PATENT DOCUMENTS

| | | | |
|---|---|---|---|
| 2,137,642 A * | 11/1938 | Cavanagh | B25C 5/0285 227/132 |
| 2,668,290 A | 2/1954 | Heller | |
| 2,947,003 A | 8/1960 | Ericsson | |
| 3,510,043 A | 5/1970 | Larson | |
| 4,129,943 A | 12/1978 | Bricker | |
| 4,552,296 A | 11/1985 | Sheng | |
| 4,643,345 A | 2/1987 | Knispel et al. | |
| 4,693,407 A | 9/1987 | Buck et al. | |
| 4,801,061 A | 1/1989 | Mangone, Jr. | |
| 5,014,897 A | 5/1991 | Uuskallio | |
| 5,094,380 A | 3/1992 | Nasiatka | |
| 5,219,110 A | 6/1993 | Mukoyama | |
| 5,263,626 A | 11/1993 | Howard et al. | |
| 5,491,899 A | 2/1996 | Schliemann et al. | |
| 5,735,444 A | 4/1998 | Wingert | |
| 5,785,227 A * | 7/1998 | Akiba | B25C 1/047 227/142 |
| 5,826,853 A | 10/1998 | Anello et al. | |
| 5,884,829 A * | 3/1999 | Wingert | B25C 1/008 227/109 |
| 5,931,364 A | 8/1999 | Dennis | |
| 6,082,604 A | 7/2000 | Dennis | |

(Continued)

FOREIGN PATENT DOCUMENTS

WO    WO-2013021224 A1 *    2/2013    ............. B25C 1/005

*Primary Examiner* — Hemant Desai
*Assistant Examiner* — Amelia Jae-Ippel Vorce
(74) *Attorney, Agent, or Firm* — Paul Y. Feng; One LLP

(57) ABSTRACT

An extendible wire guide is slidably fitted at the front of a staple gun tool housing. An easily operated lever switch is linked to the wire guide to enable the wire guide to be deployed or retracted. The lever switch includes an up and a down position corresponding to a retracted and an extended position of the wire guide. The wire guide is resiliently biased, preferably toward the retracted position. The lever switch acts on the wire guide against the bias through a cam action on an upper edge of the wire guide. A bias spring is preloaded in a subassembly of the wire guide and bias spring for simplified final assembly.

18 Claims, 2 Drawing Sheets

(56) References Cited

U.S. PATENT DOCUMENTS

| | | | |
|---|---|---|---|
| 6,131,788 A * | 10/2000 | Marks | B25C 5/06 227/119 |
| 6,532,671 B1 | 3/2003 | Jong | |
| 6,866,177 B1 | 3/2005 | Chen | |
| 7,011,242 B2 | 3/2006 | Barlow et al. | |
| 7,540,400 B2 * | 6/2009 | Zins | B25C 1/008 227/108 |
| 7,562,801 B2 | 7/2009 | Pelletier et al. | |
| 7,594,598 B2 * | 9/2009 | Chen | B25C 1/008 227/10 |
| 7,770,771 B2 | 8/2010 | Tsai | |
| 8,240,535 B2 * | 8/2012 | Shor | B25C 5/06 227/140 |
| 8,413,865 B2 | 4/2013 | Mandel et al. | |
| 8,496,151 B2 | 7/2013 | Shor | |
| 2007/0039994 A1 * | 2/2007 | Pelletier | B25C 5/06 227/132 |
| 2010/0140316 A1 | 6/2010 | Tanimoto et al. | |
| 2011/0049216 A1 * | 3/2011 | Mandel | B25C 5/06 227/140 |

\* cited by examiner

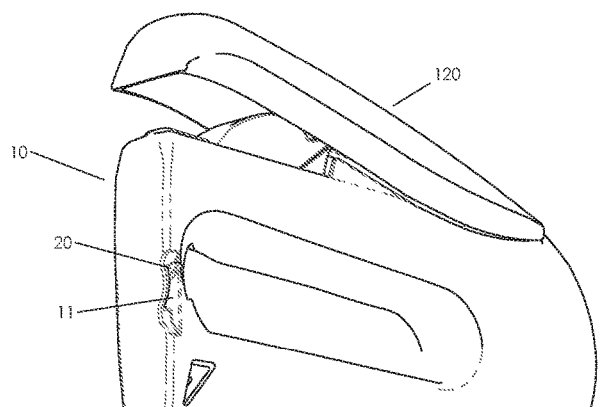
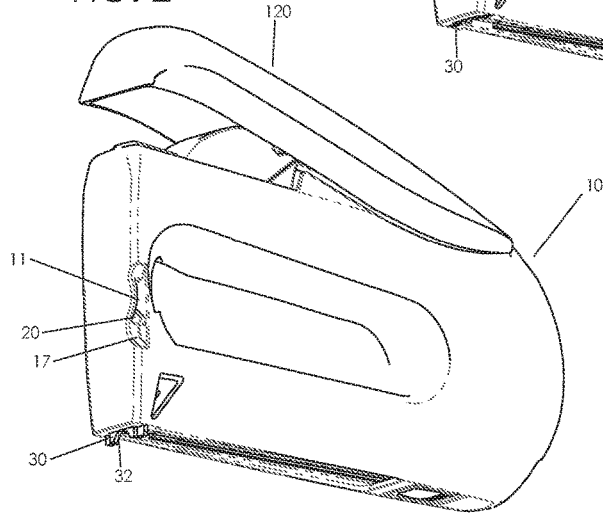
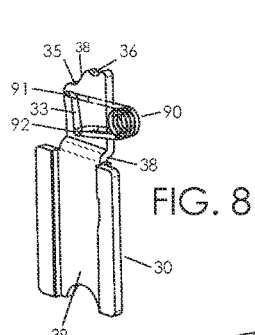
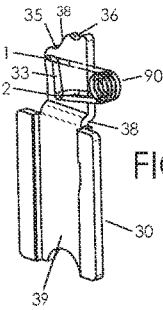
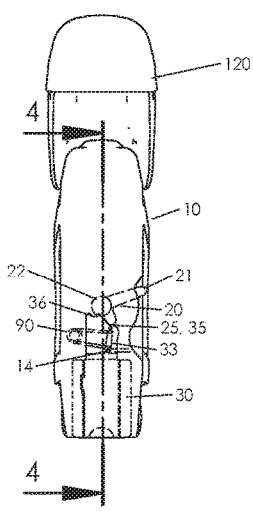
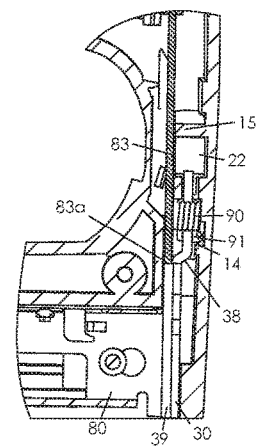
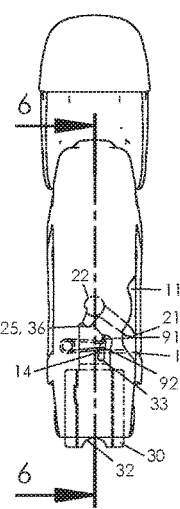
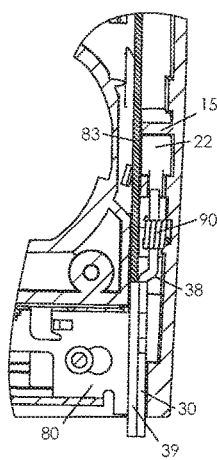

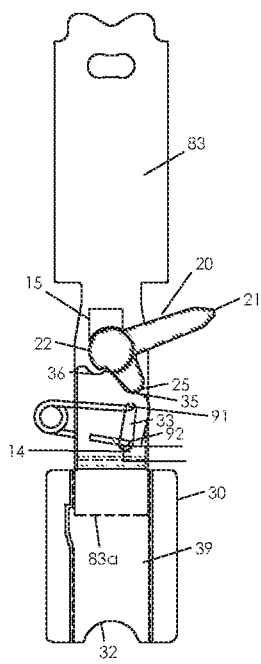
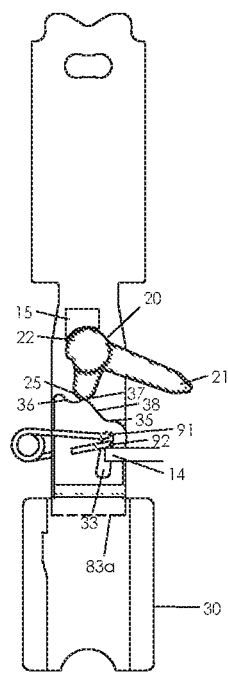
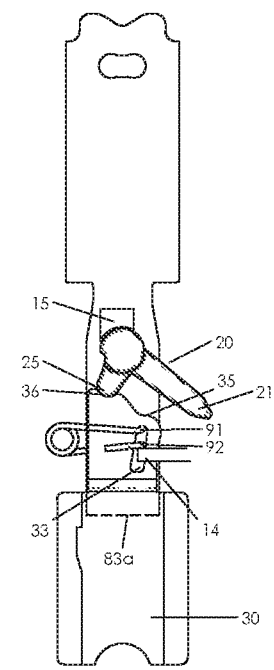
FIG. 9  FIG. 10  FIG. 11
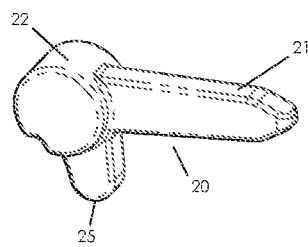
FIG. 13
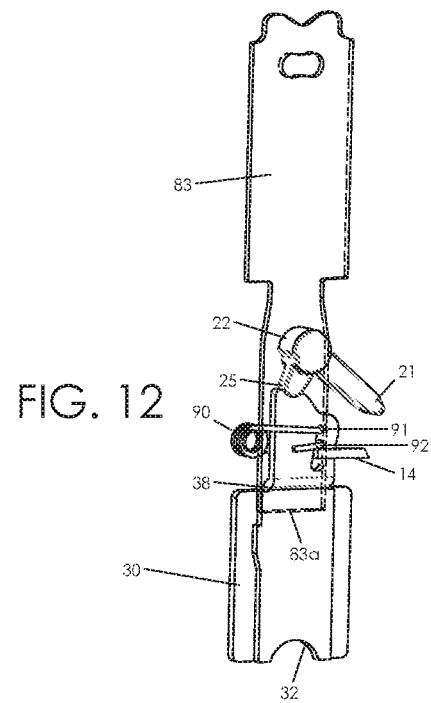
FIG. 12

FASTENING TOOL WIRE GUIDE

FIELD OF THE INVENTION

The present invention relates to fastener driving tools. More precisely, the present invention relates to improvements in the operation of fastening wires by stapling.

BACKGROUND OF THE INVENTION

Staple guns and other tacker tools are known for fastening paper, cardboard, or similar thin materials to wood or other substrates. An additional application for staple guns is to hold electrical wires or similar items in place. The staple is installed over and around the wire. Typically staple guns are effective for only one or the other application. Single purpose wire staplers have a permanent notched extension downward from the front end to position the staple over the wire. This feature, however, prevents the staple from seating flush when used for ordinary materials. Tackers with a built-in wire guide are known. However, such devices are either complex, hard to use, and/or not compact when installed within or to a tacker device.

SUMMARY OF THE INVENTION

In an exemplary embodiment of the present invention, an extendible wire guide is slidably fitted at the front of a staple gun tool housing. A lever switch or similar operating device is linked to the wire guide to enable the wire guide to be deployed or retracted. The lever switch includes an up and a down position corresponding to a retracted and an extended position of the wire guide. In a preferred embodiment, the wire guide is immediately adjacent to, and in sliding contact with, a striker element. The wire guide is resiliently biased, preferably toward the retracted position. The lever switch preferably acts on the wire guide through a cam action on an upper edge or equivalent feature of the wire guide. The cam action operates against the bias on the wire guide. A bias spring is preloaded in a subassembly of the wire guide and bias spring whereby the subassembly is easily placed into a stable position in the tool. The lever switch presents a large feature that is easy to operate.

BRIEF DESCRIPTION OF THE DRAWINGS

FIG. 1 is a front, bottom left perspective view of a fastening tool with the wire guide retracted.

FIG. 2 is the tool of FIG. 1 with the wire guide deployed.

FIG. 3 is a front elevational view of the fastening tool, with wire guide elements shown retracted in phantom lines.

FIG. 4 is a partial cross-sectional view taken along line 4-4 of FIG. 3, shown in increased scale.

FIG. 5 is the tool of FIG. 3 with the wire guide deployed.

FIG. 6 is a partial cross-sectional view taken along line 6-6 of FIG. 5, in increased scale.

FIG. 7 is a side perspective view of a bias spring.

FIG. 8 is a rear, side perspective view of a wire guide and spring subassembly, with the spring reversed in view from FIG. 7.

FIG. 9 is a front elevational view of an assembly of a wire guide, bias spring, lever switch, and striker in a retracted position, with a housing removed for clarity.

FIG. 10 is the view of FIG. 9 in a partly deployed position.

FIG. 11 is the view of FIG. 9 in a deployed position.

FIG. 12 is a front perspective view of the assembly of FIG. 11.

FIG. 13 is a front perspective view of the lever switch.

DETAILED DESCRIPTION OF THE PREFERRED EMBODIMENTS

The present invention in a preferred embodiment is directed to an extendible wire guide that is slidably fitted at the front of a staple gun tool housing. In the drawing figures, an exemplary, staple gun or tacker tool is shown. As illustrated, it is a forward action tacker wherein handle 120 is at or near a top of the housing hinged at a rear of the tool, toward the right in FIG. 1, and pressed near a front, left in FIG. 1. Fasteners are guided upon or by fastener guide track 80 located along a lower portion or bottom of the tool. The staple or other fastener exits at the forward location of wire guide 30. The present wire guide may be fitted to a rear action tacker wherein the handle is hinged at a front and pressed rearward of the front.

In FIGS. 1, 3, and 9, wire guide 30 is stowed, being preferably substantially flush with a bottom of housing 10. Lever switch 20 is in a corresponding stowed position, being at a top or upper termination of slot 11 as shown. The lever switch 20 has associated parts that are attached to or pivot with the lever switch. An end of arm 21 of the lever switch 20 is exposed on a side of housing 10.

As described below, the wire guide is biased preferably to its stowed position by a spring or equivalent structure. The wire guide is thus stable in the stowed position. The lever switch operates on an edge or equivalent feature of the wire guide to press against the spring to the deployed position, where the edge forms a cam path or equivalent surface or structure. The present embodiment thus has essentially zero free play, with any tolerance in the wire guide linkages compensated by the continuous force of the spring acting against the lever switch. This contrasts with conventional wire guide designs wherein a cam operates in a slot of a wire guide to actively move the wire guide in both directions. Such a slot necessarily has some free play so that the user operated cam structure will be loose in proportion to this free play. A further advantage of the present invention single edge cam path is its compact structure. The functional edges face generally upward to preferably form the terminating upper extent of the wire guide. A slot requires a larger, less compact, cam region of the wire guide to provide both an upward and a downward facing edge; the downward edge corresponds to an extra extending upper structure that is obviated by the present downward-only cam force action.

In FIGS. 2, 5, 11, and 12, lever switch 20 is moved to a lower position at or near a bottom of slot 11, FIG. 2, to move wire guide 30 to its deployed position extending downward from housing 10. When deployed, the wire guide 30 holds the tacker spaced from a work surface to prevent damage to an electric cable, for example, or similar object to be fastened. A staple is held away from the work surface forming a space whereby the cable can fit below the staple crown. Recess 32 provides clearance for the wire and a guide to position the tacker over wires or equivalent items to be fastened to a work surface. Maintaining a controlled space under a staple is also useful, for example, when it is desired to later attach something to the staple, for example, a string or wire tie, or to prevent damage to a soft material.

Channel 39, FIG. 8, provides a guide for staple fasteners as they exit from the tool under the urging of striker 83 at edge 83a, FIG. 9. Striker 30 is preferably actuated and propelled by a power source that is based on, for example, spring energy, lever action, a solenoid, or an electric motor. Preferably, as shown, wire guide 30 provides at least two functions: as a wire guide to hold and guide the tool spaced above a work surface, and as a nose piece to guide the striker and staples in front of track 80. By serving as a nose piece, the tool is compact in the area of the wire guide whereby an extra nose piece component stacked in front or behind the wire guide 30 is not required. In FIGS. 9 to 12, the striker is in the same upper pre-release position in the housing, as occurs at rest or before a staple is ejected from the tool. The relative position of wire guide 30 is thus readily seen.

A subassembly of spring 90 and wire guide 30 is preferably pre-assembled with spring 90 preloaded upon wire guide 30, FIG. 8. Lower spring arm 92 and upper spring arm 91 fit in slot 33 of the wire guide. Offset 38 provides room for the spring and arm in front of striker 83, FIGS. 4 and 6. With the subassembly internally preloaded, it can be installed into the larger tool assembly with the spring still pressing primarily within the subassembly rather than against housing 10, for example. Without this internal preload, the wire guide 30 could be forced out of position by the spring 90 before the final assembly is completed.

In accordance with the preloaded subassembly, lower spring arm 92 presses housing shelf 14, FIG. 9; see also FIG. 4. A small interference fit against shelf 14 preferably pushes arm 92 slightly away from a bottom of slot 33. The preload no longer internal to the subassembly being now between shelf 14 and a top of slot 33 to provide a positive upward force on wire guide 30 in housing 10 via shelf 14. The upward force holds the wire guide 30 without looseness or rattling. The interference or friction fit is sufficient enough to keep the wire guide 30 snug, but not so much to risk the wire guide 30 flying out of the housing during final assembly. For example, causing spring arm 92 to deflect not at all may optionally allow for rattle while deflecting about one wire diameter on shelf 14 will provide the desired rattle-free snug fit.

FIGS. 9 to 12 show the operation of the preferred embodiment wire guide 30. FIGS. 3 to 6 show alternate views of the respective operational steps. In FIG. 9, the wire guide is stowed, being in an upper position relative to striker 83, striker edge 83a and to housing 10, FIG. 3. An upward facing edge or surface of wire guide 30 forms a cam path including ramp 38 and recess landings 35 and 36. In FIG. 9, cam path recess 35 presses upward against lever cam 25. Pressing lever arm 21 downward causes lever pivot 22 to rotate in housing bearing 15, clockwise in the drawing views, with lever cam 25 moving in an arcuate motion about pivot 22. The lever switch 20 moves toward the intermediate position of FIG. 10, cam 25 sliding along profile ramp 38 between the positions of FIGS. 9 and 10. The wire guide 30 moves preferably vertically linearly within housing 10, guided by faces of the housing. In the position of FIG. 10, the wire guide 30 is in a lowest position as cam 25 slides over hump 37. In the deployed position of FIG. 11, the wire guide 30 moves slightly upward from the intermediate position while cam 25 fits to cam path recess 36. Lever switch 20 is thus stable in the stowed position of FIG. 9 and the deployed position of FIG. 11. Bearing 15 engages pivot 22 primarily from above as shown, since lever switch 20 is confined from below by wire guide 30.

As seen in FIGS. 10 and 11, the spring arms 91, 92 are deflected toward each other as spring arm 91 is pulled down by slot 33 and spring arm 92 stays in position on shelf 14. The deployed position of the system is seen in a perspective view in FIG. 12.

To retract the wire guide 30, lever arm 21 is pulled upward. Enlarged housing recess 17, FIGS. 2 and 5, facilitates access to the lever switch 20 from below. As seen in FIG. 3, the lever arm 21 protrudes outward farther in the stowed position owing to the vertical position of bearing 15. Therefore, a similar recess to 17 is not required at the upper area.

The parts of the tacker tool, including the wire guide system, may be assembled into housing 10 where housing 10 includes a left side, out of the page in FIG. 1, and a right side, into the page. Lever switch 20 may be installed into slot 11 in the same manner, with lever arm 21 placed into slot 11 from behind the page in FIG. 1 to extend out as shown for user access. In this manner, all the wire guide parts can be assembled into the left housing from an interior direction of the housing. This process avoids a need for manipulating the housing during assembly.

As described herein, a built in extendable wire guide includes improvements in construction and utility. An operating lever switch is readily visible and easily accessed on a side of the tool housing. The lever switch preferably operates in the same direction as the wire guide. Specifically, moving the lever switch down moves the wire guide in the same downward direction, and likewise for the upward direction. This is far more intuitive than, for example, a wheel or dial that rotates to deploy a wire guide.

The wire guide is continually biased upward, or at least the lever cam is in opposition to a direction of the bias force. For example, the wire guide may be biased toward the deployed position with the lever switch pressing the wire guide on a downward facing edge or feature to move the wire guide upward toward the stowed position. Either structure avoids a requirement for a cam slot with opposed faces and its related tolerance and rattle, although such a slot may be included to supplement the bias action.

While particular forms of the invention have been illustrated and described, it will be apparent that various modifications can be made without departing from the spirit and scope of the invention. It is contemplated that elements from one embodiment may be combined or substituted with elements from another embodiment.

What is claimed is:

1. A fastening tool to attach objects to a work surface, comprising:
   a housing including a top, bottom, rear and front;
   a fastener guide track disposed at the bottom of the housing;
   a striker movable vertically on the housing at a front of the guide track;
   a wire guide disposed at a location of the striker, the wire guide including a stowed position within the tool and a deployed position extended out from the tool;
   a spring, wherein the spring biases the wire guide toward the stowed position; and
   a lever switch linked to the wire guide through a cam engagement, wherein a first position of the lever switch allows the wire guide to be in the stowed position under the bias of the spring, and a second position of the lever switch causes the lever switch to press the wire guide to the deployed position against the bias of the spring.

2. The fastening tool of claim 1, wherein the wire guide is movable vertically on the housing, the wire guide is in an upper position in the stowed position of the wire guide, and the wire guide is in a lower position in the deployed position of the wire guide.

3. The fastening tool of claim 2, wherein the wire guide moves linearly in the housing between the stowed and the deployed positions.

4. The fastening tool of claim 3, wherein the lever switch operates to press an upward facing edge of the wire guide.

5. The fastening tool of claim 1, wherein the lever switch is pivotally mounted to the housing at a lever pivot, a lever arm of the lever switch extends out from the housing including an upper arm position corresponding to the stowed position of the wire guide, and a lower arm position corresponding to the deployed condition of the wire guide.

6. The fastening tool of claim 5, wherein the lever arm extends through a slot in the housing.

7. The fastening tool of claim 6, wherein the slot is exposed on a side of the housing.

8. The fastening tool of claim 6, wherein the lever arm is disposed at an upper end of the slot with the wire guide in the stowed position, and the lever arm is disposed at a lower end of the slot with the wire guide in the deployed position.

9. The fastening tool of claim 4, wherein the upward facing edge includes a cam path surface, the cam path surface slidably engages a cam of the lever switch, the cam path surface including a ramp between a first landing and a second landing, the wire guide being in the stowed position when the lever cam is disposed at the first cam path landing, the wire guide being in the deployed position when the lever cam is disposed at the second cam path landing.

10. The fastening tool of claim 1, wherein a subassembly of the spring and the wire guide is pre-assembled with the spring preloaded upon the wire guide.

11. The fastening tool of claim 10, wherein the spring includes a torsion spring and arms of the torsion spring press the wire guide within a slot of the wire guide.

12. The fastening tool of claim 11, wherein the subassembly is assembled into the fastening tool, and in the wire guide deployed position, an upper arm of the spring presses the slot of the wire guide and a lower arm of the spring presses a shelf of the housing to bias the wire guide toward the stowed position.

13. A fastening tool to attach objects to a work surface, comprising:
a housing including a top, bottom, rear and front;
a fastener guide track disposed at the bottom of the housing;
a striker movable vertically on the housing at a front of the guide track;
a wire guide disposed proximate a location of the striker, wherein the wire guide includes a stowed position within the tool and a deployed position extended out from the tool;
a lever switch linked to the wire guide through a cam of the lever switch, the cam undergoing an arcuate motion about a lever pivot as the lever switch is moved from a first position to a second position;
a cam path surface of the wire guide slidably engaging the cam of the lever switch, the cam path surface including a ramp between a first landing and a second landing, the wire guide being in a stowed position when the lever cam is at the first cam path landing, and the wire guide being in a deployed position when the lever cam is at the second cam path landing; and
a spring, wherein the spring biases the wire guide against the lever cam, and moving the lever causes the wire guide to move between the stowed position and the deployed position against the bias of the spring.

14. The fastening tool of claim 13, wherein an arm of the lever switch extends from the lever pivot to an arm end exposed on a side exterior of the housing.

15. The fastening tool of claim 14, wherein the arm moves within a slot of the housing between a top of the slot and a bottom of the slot.

16. The fastening tool of claim 13, wherein the cam path surface faces upward at a top of the wire guide, and the lever cam presses the wire guide downward on the cam path surface against the bias of the spring.

17. The fastening tool of claim 13, wherein a subassembly of the spring and the wire guide is pre-assembled with the spring preloaded upon the wire guide.

18. The fastening tool of claim 17 wherein the spring includes a wire torsion spring and arms of the torsion spring press the wire guide within a slot of the wire guide.

* * * * *